United States Patent [19]

Bonazoli et al.

[11] 4,373,146

[45] Feb. 8, 1983

[54] METHOD AND CIRCUIT FOR OPERATING DISCHARGE LAMP

[75] Inventors: Robert P. Bonazoli, Hamilton; Fredrick W. Paget, Rockport, both of Mass.

[73] Assignee: GTE Products Corporation, Stamford, Conn.

[21] Appl. No.: 198,321

[22] Filed: Oct. 20, 1980

[51] Int. Cl.³ .............................................. H05B 41/24
[52] U.S. Cl. ................................. 315/209 R; 315/174; 315/224; 315/246; 315/DIG. 7; 315/226
[58] Field of Search ................ 315/160, 172, 174, 176, 315/209 R, 224, 226, 246, 291, 307, DIG. 5, DIG. 7

[56] References Cited

U.S. PATENT DOCUMENTS 4,060,752  11/1977  Walker ............................ 315/224 X

FOREIGN PATENT DOCUMENTS 1128041  4/1962  Fed. Rep. of Germany ... 315/DIG. 7

Primary Examiner—Eugene La Roche
Attorney, Agent, or Firm—Edward J. Coleman

[57] ABSTRACT

A method of operating a high intensity discharge lamp having a pair of electrodes hermetically sealed within an arc tube, the method comprising frequency modulation of a carrier waveform in the kilohertz range to provide a variable frequency AC output, and applying the AC output across the electrodes of the lamp to thereby operate the lamp in a manner which minimizes or avoids acoustic resonance effects within the arc tube. The circuit includes an inverter having a first input provided by a DC power source and a drive input coupled to a square wave carrier generator which is frequency modulated by a ramp generator. The resulting variable frequency AC output of the inverter is then coupled across the lamp electrodes.

15 Claims, 1 Drawing Figure

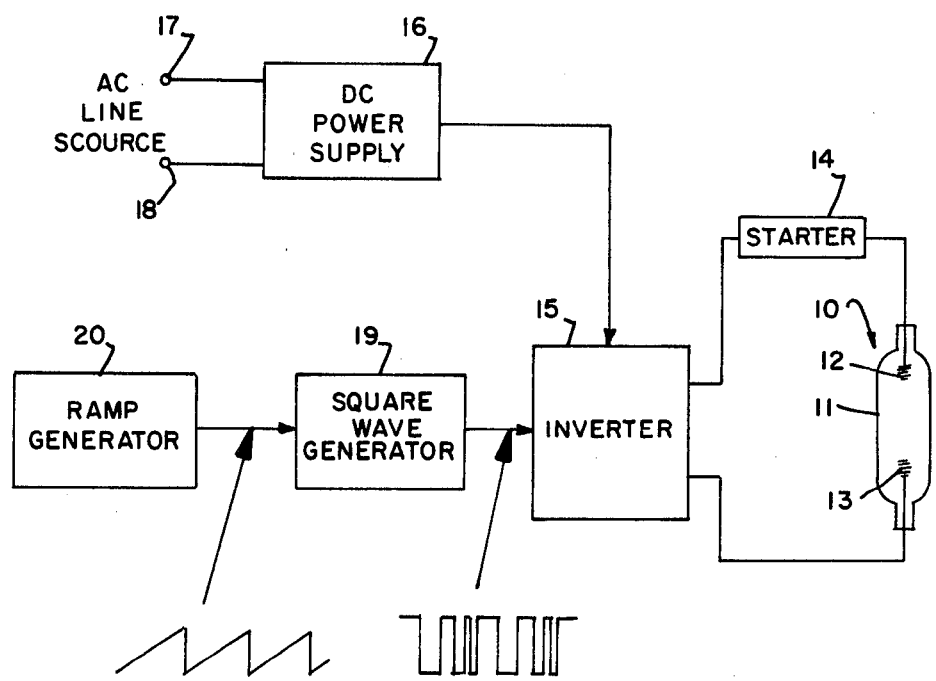

METHOD AND CIRCUIT FOR OPERATING DISCHARGE LAMP

BACKGROUND OF THE INVENTION

This invention relates to discharge lamp operating circuits, and more particularly, to high frequency circuits for efficiently operating high intensity discharge (HID) lamps.

Attempts to operate HID lamps from so called electronic ballasts often have been confronted with a problematic phenomena referred to as acoustic resonance. This phenomena causes the arc within the lamp to girate, flicker, and even to extinguish when a ballast circuit is designed to operate the lamp at frequencies greater than a few kilohertz. Of the several classes of electronic ballasts, the types that operate the HID lamps on high frequency AC tend to be the most desirable from the lamp operating point of view, if the acoustic resonance problem can be overcome. The high frequency output for operating the lamp can be generated with compact, light-weight circuits, and lamp efficiency is enhanced by the use of high frequency; for example, use U.S. Pat. No. 4,170,746. Other types of electronic ballasts using DC lamp operation or phase control at low frequencies are not as desireable from a lamp life point of view. Also, DC operation can cause segregation of additives in metal halide lamps which causes color bands to appear within the arc. Since high frequency AC operation is deemed desireable, therefore, a particularly challanging problem is overcome in this field is the aforementioned acoustic resonance phenomena.

The arc tubes employed in HID lamps are hollow tubes of alumina, quartz or hard glass shaped in various sizes with cupped or conical ends and filled with gas at several different pressures. The exact gas pressure depends on the operating state of the lamp, the pressure being comparatively low for a cold start and becoming progressively higher as a lamp warms up over a period of several minutes. "Organ Pipe" resonances can occur at different lamp operating frequencies depending on the size, shape, and pressure within the arc tube. For example, we have found that larger lamps, e.g., in the 400 and 1,000 watt category, have resonances at operating frequencies at and above 2 kilohertz, with harmonics well up into the supersonic range. Smaller lamps, e.g., 175 watts, 100 watts, etc., have resonances at higher frequencies. Operation near a resonance point on high frequency AC causes the arc to flicker, stretch, elongate and spiral. Sometimes the lamp extinguishes. Arc tube breakage due to resonance has been reported in the literature.

Heretofore, it appears that no method has been known for obviating this phenomena of acoustic resonance other than to avoid the resonance range of frequencies for a given lamp arc tube; for example, see the aforementioneds U.S. Pat. No. 4,170,746. Operation at any frequency above primary resonance, however, can also be problematical because of lamp pressure variability with temperature and the differences from lamp to lamp in arc tube shape.

Other solutions to this problem that have been proposed include placing quartz wool inside the arc tube so as to damp the resonances; however, we are aware of no practical success in this area. It has also been suggested that square wave AC operation of the lamp would overcome the problem. Although such operation has resulted in a slight reduction in the severity of the resonance problem, this approach does not provide the complete answer, possibly because it is nearly impossible to generate a power AC with a perfect square wave shape. The deviations from the perfect square wave comprise overshoots, droops, and ringing which excite the lamp into resonance in any event.

SUMMARY OF THE INVENTION

Accordingly, it is an object of the present invention to provide an improved method and circuit for operating a high intensity discharge (HID).

A particular object of the invention is to provide a high frequency (i.e., the kilohertz range) mode of operation of a high intensity discharge lamp which minimizes or avoids acoustic resonance effects within the arc tube.

These and other objects, advantages and features are attained, in accordance with the invention, by a method of operation which comprises frequency modulating a carrier waveform in the kilohertz range to provide a variable frequency AC output, and applying this AC output across the electrodes of an HID lamp to thereby operate the lamp in a manner which minimizes or avoids acoustic resonance effects within the arc tube. The circuit comprises, in combination, a DC power source having an output, an inverter having a DC input coupled to the output of the DC souce, a carrier waveform generator in the kilohertz range having an output coupled to drive the inverter, means for frequency modulating the carrier waveform whereby the inverter is provided with a variable frequency AC output, and means coupling this AC output of the inverter across the electrodes of the lamp.

In a preferred embodiment the carrier waveform generator is a square wave generator having a voltage controlled frequency of at least 20 kilohertz. The frequency modulating means preferably comprises a ramp generator having a voltage output coupled to the square wave generator. In a specific example, the ramp period may lie in the range of 1 to 10 milliseconds with a flyback of less than 1 microsecond, and the adplication of the ramp voltage to the square wave generator causes the carrier waveform to be periodically swept from about 20 to 30 kilohertz. This mode of operation supresses resonance since the exciting waveform does not remain at the resonance frequency for any significant range of time, as the frequency is constantly changing.

BRIEF DESCRIPTION OF THE DRAWINGS

This invention will be more fully described hereinafter in conjunction with the accompanying drawing, the single FIGURE of which is a block diagram of a circuit employing a method, according to the invention, for operating a high intensity discharge lamp.

DESCRIPTION OF PREFERRED EMBODIMENT

Referring to the drawing, there is shown a block diagram illustrating one embodiment of a high frequency electronic ballast circuit for operating an HID lamp 10 in an anti-acoustic resonance mode in accordance with the invention. The circuit is particularly useful with high pressure arc discharge lamps of the metal halide type having wattage ratings in the order of 175, 200 and 400 watts, etc. Such lamps are well known in the art and typically include an arc tube formed, for example, of quartz glass, and containing a pair of spaced apart electronics 12 and 13, which are hermetically sealed within the arc tube. The arc tube contains a starting gas at a selected pressure and can also contain a small amount of mercury or metal halides. The arc tube may then be housed in an outer jacket of hard glass, in the form of a transparent or phosphor coated envelope, which may be filled with nitrogen.

The circuit immediately coupled to the lamp electrodes includes an inverter 15 for providing the AC operating voltage for the lamp and, when required, a conventional starting circuit 14. The conventional inverter circuit typically employs an oscillator or other clock source which drives switching means coupled across a DC source. For example, U.S. Pat. Nos. 4,170,746, 4,188,660 and 4,188,661 describe high frequency inverter circuits for operating arc discharge lamps.

The block diagram of the drawing illustrates one of the inputs to the inverter 15 as comprising a conventional DC power supply 16, which may comprise a full wave bridge rectifier having a filter capacitor across the output. The input terminals 17 and 18 of the DC supply are connected to an AC line source, e.g., 120 volts, 60 Hz. In lieu of using a conventional oscillator or clock source output as the drive input to the inverter switching arrangement, the circuit according to the present invention employs a frequency modulated carrier waveform. In this manner, the inverter circuit 15 is provided with a variable frequency AC output. Hence, the frequency of the lamp operating voltage is constantly changing, whereby resonance is suppressed since the exciting waveform does not stay at the resonance frequency for any significant length of time. We have discovered that the most desireable wave shape for the carrier is a square wave, or the best practical approximation to a square wave, and the optimum modulation is a ramp function with a very fast flyback.

According to the preferred embodiment illustrated in the drawing, therefore, the circuit according to the invention further includes a drive input for the inverter provided by a conventional square wave generator 19 having a voltage controlled frequency input. The means for frequency modulating this square wave carrier comprises a conventional ramp generator 20 having a voltage output coupled to the voltage controlled frequency input of the square wave generator 19. In one specific embodiment, a 175 watt metal halide high pressure HID lamp was selected for initial testing of a circuit. The carrier frequency of the square wave generator was maintained between 20 kilohertz and 30 kilohertz to stay within a range where efficient power transistor switching can be obtained in a practical ballast. The best results were completely stable and free from resonances. These successful results were obtained using a 10 millisecond ramp for modulating a square wave carrier at 25 kilohertz. The range of the periodic sweeping of the resultant waveform was from 25 to 50 kilohertz. A sinewave carrier was found less suitable, and a sinewave or triangle wave modulating waveform, did not function as well. The preferred ramp periods were from 1 to 10 milliseconds. At ramp periods less than 1 millisecond the stability of lamp operation was degraded.

The circuit was also operated successfully using a 200 watt electrode stabilized metal halide lamp lamp and 175 watt and 400 watt mercury lamps.

The center or carrier frequency was varied from 20 to 30 kilohertz without the frequency modulation, and a resonance was observed at 27 kilohertz in a 175 watt metal halide high pressure HID lamp. With the frequency modulation applied to the carrier, this resonance was not observed. Again the test was performed using a square wave carrier and frequency modulation by use of a positive ramp with a flyback or retrace time of less than 1 microsecond and a ramp period of about 10 milliseconds. The square wave carrier is swept typically from 20 to 30 kilohertz or 25 to 50 kilohertz, etc., depending upon the amplitude of the modulation ramp applied to the voltage controlled frequency input of the square wave generator. As illustrated by the waveforms associated with different points on the block diagram, the periodic application of the ramp voltage to the square wave generator results in a rectangular waveform output having progressively varying pulse widths as a periodic function of the ramp waveform modulation.

Although the invention has been described with respect to a specific embodiment, it will be appreciated that modifications and changes may be made by those skilled in the art without departing from the true spirit and scope of the invention. For example, the illustrated starter may not be required in many applications.

We claim:

1. A method of operating a high intensity discharge lamp having a pair of electrodes hermetically sealed within an arc tube, the method comprises frequency modulating a carrier waveform in the Kilohertz range to provide an AC output having a continuously varying frequency, and applying said AC output across the electrodes of said lamp to thereby operate said lamp in a manner which minimizes or avoids acoustic resonance effects within said arc tube.

2. The method of claim 1 wherein said carrier waveform has a frequency of at least 20 kilohertz.

3. The method of claim 2 wherein said carrier is approximately a squarewave.

4. The method of claim 2 wherein said carrier waveform is frequency modulated by periodically sweeping the frequency of said carrier in the manner of a ramp function, the ramp period being in the range of 1 to 10 milliseconds with a flyback of less than 1 microsecond.

5. The method of claim 4 wherein the frequency of said carrier is swept from about 20 to 30 kilohertz.

6. The method of claim 4 wherein the frequency of said carrier is swept from about 25 to 50 kilohertz.

7. The method of claim 1 wherein said carrier waveform is frequency modulated by periodically sweeping the frequency of said carrier in the manner of a ramp function.

8. A circuit for operating a high intensity discharge lamp having a pair of electrodes sealed within an arc tube, said circuit comprising in combination: A DC power source having an output; an inverter having a DC input coupled to the output of said DC source; a generator for developing a carrier waveform in the Kilohertz range having an output coupled to drive said inverter; means for frequency modulating said carrier waveform coupled to said generator whereby said inverter is provided with an AC output continuously varying in frequency; and means for coupling said AC output of said inverter across the electrodes of said lamp to thereby operate said lamp in a manner which minimizes or avoids acoustic resonance effects within said arc tube.

9. The circuit of claim 8 wherein said carrier waveform has a frequency of at least 20 kilohertz.

10. The circuit of claim 9 wherein said carrier waveform generator is a square wave generator having a voltage controlled frequency.

11. The circuit of claim 10 wherein said frequency modulating means comprises a ramp generator having a voltage output coupled to said square wave generation for controlling the frequency thereof.

12. The circuit of claim 11 wherein the voltage output of said ramp generator has a ramp period in the range of 1 to 10 milliseconds with a flyback of less than 1 microsecond, and the frequency of said carrier waveform is swept from about 20 to 30 kilohertz.

13. The circuit of claim 11 wherein the output of said ramp generator upon application to said square wave generator is operative to sweep the frequency of said carrier from about 25 kilohertz to 50 kilohertz.

14. The circuit of claim 8 further including a starter circuit coupled to said lamp.

15. The circuit of claim 8 wherein said frequency modulating means comprises a ramp generator having a voltage output coupled to said carrier waveform generator for periodically sweeping the frequency thereof.

* * * * *